Dec. 1, 1970  S. L. GOETZ  3,544,210
AUTOMATIC DISSOLVE CONTROL FOR SLIDE PROJECTORS HAVING
A SOURCE OF ILLUMINATION AND A SIGNAL
ACTUATED SLIDE ADVANCE
Filed Jan. 24, 1969

INVENTOR.
SEYMOUR L. GOETZ

BY Pepper, Bain & Bobis

ATTORNEYS

United States Patent Office

3,544,210
Patented Dec. 1, 1970

3,544,210
AUTOMATIC DISSOLVE CONTROL FOR SLIDE PROJECTORS HAVING A SOURCE OF ILLUMINATION AND A SIGNAL ACTUATED SLIDE ADVANCE
Seymour L. Goetz, 202 E. 44th St., Brooklyn, N.Y. 10017
Filed Jan. 24, 1969, Ser. No. 793,724
Int. Cl. G03b 21/36
U.S. Cl. 353—86                            6 Claims

ABSTRACT OF THE DISCLOSURE

An automatic dissolve control for each of at least a pair of projectors focused in registration on a screen having automatic or manual means for actuating the projectors alternately wherein both projectors are momentarily simultaneously illuminated and thereafter, the source of illumination of alternate projectors is dimmed to extinction and a signal imposed upon the slide advance circuit of that projector wherein the dimming of the source of illumination of the projector is controlled by the automatic and predetermined rate of decay of a photocell light source, the resistance of the photocell biasing a dimmer output circuit for the projector illumination functioning as a full wave rectifier, the dimmer and slide advance signal control circuits being electrically isolated from the projector illumination circuit.

BACKGROUND OF INVENTION

It is well known that a plurality of slide projectors, usually two, may be focused in registration on a single screen. The projectors are actuated alternately to project images on the screen. However, it is undesirable that the screen be absolutely dark even for a moment. Thus, means are provided to momentarily energize the source of illumination of both projectors, thereby casting, in registration, two images on the same screen. Thereafter, the source of illumination of the projector whose slide has already been viewed, is rapidly dimmed so that the image cast by the other projector may be viewed without distortion.

Many systems have been suggested for controlling such pairs of projectors. Some systems are strictly electromechanical, requiring the operator to control the rate of decay of the source of projector illumination. Such a system is inexacting, requires too much operator attention, and cannot be operated completely automatically.

Automatic systems have also been suggested. However, existing automatic systems suffer from two common undesirable characteristics. Firstly, the means for dimming the source of illumination of the projector, usually SCR circuits, reduce full intensity output of the source of illumination of the projector by as much as 25% to 50%. This is highly undesirable since the rated intensity of most projector lamps is marginal to begin with and a substantial reduction diminishes the intensity of the image to unacceptable levels.

Secondly, existing dissolve controls are electrically connected to and carry the same voltage as the projector lamp. It is preferable to employ control circuits operating on lower voltages which should be totally, electrically isolated from the projector lamp circuit.

It is among the objects and advantages of the invention described and claimed herein to provide a dissolve control for slide projectors having a source of illumination and a signal actuated slide advance in which the dimmer output which biases the projector lamp has a maximum output power substantially equal to the input power, resulting in little or no loss of projector lamp illumination at maximum operating values.

Another object of the present invention is to provide a dissolve control as aforesaid in which the means for controlling dimmer output power are electrically isolated from the projector lamp circuit.

PREFERRED EMBODIMENT OF INVENTION

The objects and advantages aforesaid as well as other objects and advantages may be achieved by the dimmer control, a preferred embodiment of which is illustrated herein, in which.

Figure 1:
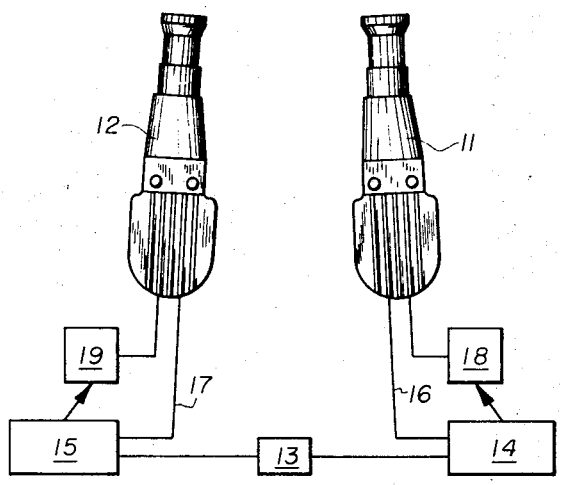
FIG. 1 is a schematic diagram of the dissolve control for a pair of slide projectors.

Referring now to the drawings in detail, the dissolve control is adapted to actuate a plurality of projectors, illustrated herein as a pair of projectors 11 and 12. A manually or automatically controlled latching relay 13 is connected to each of a pair of dimmer control means and slide signal generators 14 and 15. The slide advance signal generator output of each of the control means 14 and 15, respectively 16 and 17, is connected to the slide advance trip circuit of projectors 11 and 12, respectively.

The dimmer control means 14 and 15 each are electrically isolated from the dimmer output 18 and 19 for the projectors 11 and 12 respectively. The control means 14 and 15 actuate the dimmer outputs 18 and 19 by means of the interaction of a light source in the control means 14 and 15 and a responsive photocell in the dimmer outputs 18 and 19.

Figure 2:
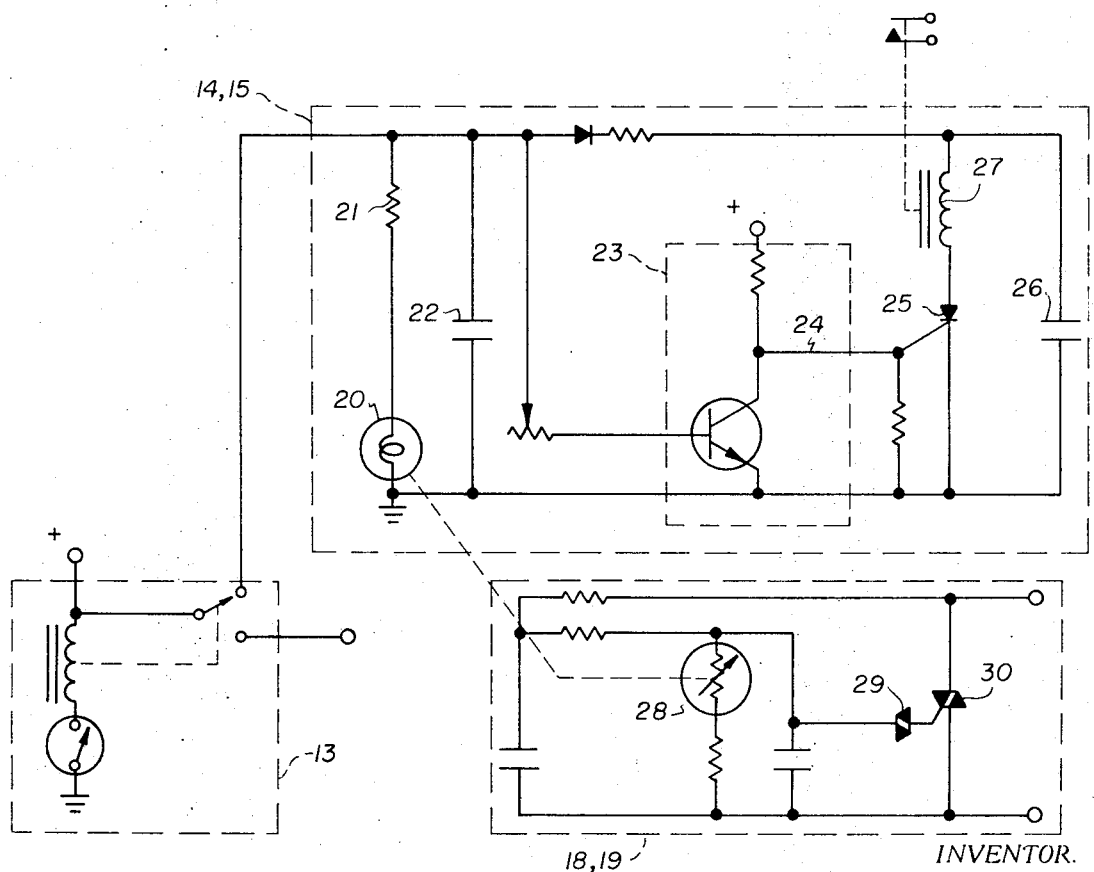
FIG. 2 is a circuit diagram of the dissolve control illustrated in FIG. 1.

Referring now to FIG. 2 in detail, a dissolve control for one projector is illustrated, together with the latching relay 13. The latching relay 13 is biased by a low impedance regulated 25-volt D.C. power supply source. The dimmer control circuit comprises a light source 20 which is controlled by an RC circuit comprising resistor 21 and capacitor 22. When the latching relay 13 energizes the dimmer control 14 or 15, capacitor 22 immediately charges until transistor 23 reaches saturation. Transistor 23 operates as a switch, when the RC circuit of light source 20 is de-energized by the latching relay 13, capacitor 22 discharges through resistor 21 and light source 20. The light source 20 decays in intensity at a precontrolled rate determined by the RC constant.

When light source 20 reaches a minimum value, transistor 23 conducts through resistor 24 to an SCR circuit 25. Capacitor 26, which is now fully charged, immediately discharges through coil 27 to generate a signal to the slide advance output 16 or 17.

The dimmer output 18 or 19 comprises a photocell 28, the resistance of which is responsive to the intensity of light source 20. The photocell 28 is connected to a DIAC 29 and a TRIAC 30. The phase of DIAC 29 and TRIAC 30 is adjusted by the resistance of photocell 28 as it varies in responsre to the varying intensity of light source 20. Thus, the dimmer output which biases the lamp of the projector 11 or 12, varies from a maximum to a minimum value over a time constant determined by the rate of decay of light source 20.

In operation, if it is assumed that projector 11 is illuminated and casts an image on screen 31, the dimming sequence proceeds as follows. the latching relay 13 is actuated, either manually or automatically, which immediately energizes the lamp of projector 12. Momentarily, both projectors 11 and 12 cast images on screen 31. However, actuation of the latching relay 13 has simultaneously actuated the dimmer control circuit 14 governing projector 11. Immediately, light source 20 which is illuminated, begins to decay in intensity. As light source 20 decays in intensity, the output of dimmer 18 biasing the lamp of projector 11 diminishes at a rate determined by the decay of the light source 20. Thus, the image cast by projector 11 dissolves or fades, leaving only the image cast by projector 12.

The foregoing description is merely intended to illustrate an embodiment of the invention. The component parts have been shown and described. They each may have substitutes which may perform a substantially similar function for the said components; such substitutes may be known as proper substitutes for the said components and may have actually been known or invented before the present invention.

What is claimed:

1. A disolve control for a slide projector having a source of illumination and a signal actuated slide advance comprising
   (a) a light source,
   (b) means for initiating and automatically controlling decay of intensity of the light source at a predetermined rate,
   (c) a photocell, the resistance of which varies in response to decay of intensity of the light source,
   (d) means for dimming the intensity of projector illumination biasing the source thereof and connected to and governed by variations in resistance of the photocell,
   (e) a slide advance signal generator connected to the aforesaid means for automatically controlling the rate of decay of the light source, a signal being generated automatically when the light source decays to minimum intensity.

2. A dissolve control for a slide projector having a source of illumination and a signal actuated slide advance comprising
   (a) the structure in accordance with claim 1 in which
   (b) the means for dimming the intensity of projector illumination has an output power substantially equal to input power.

3. A dissolve control for a slide projector having a source of illumination and a signal actuated slide advance comprising
   (a) the structure in accordance with claim 2 in which
   (b) the means for dimming the intensity of projector illumination functions substantially as a full wave rectifier.

4. A dissolve control for a slide projector having a source of illumination and a signal actuated slide advance comprising
   (a) the structure in accordance with claim 3 in which
   (b) the means for dimming the intensity of projector illumination include a DIAC and a TRIAC.

5. A dissolve control for slide projectors having a source of illumination and a signal actuated slide advance comprising
   (a) the structure in accordance with claim 1 in which
   (b) the means for controlling the rate of decay of the light source and the signal generator are connected through a transistor which when saturated deenergizes the signal generator and when unsaturated, energizes the signal generator.

6. A dissolve control for slide projectors having a source of illumination and a signal actuated slide advance comprising
   (a) the structure in accordance with claim 1 in which
   (b) both the light source and the signal generator are energized by the discharge of separate capacitors, the capacitor energizing the signal generator, discharging only after discharge of the capacitor energizing the light source.

References Cited

UNITED STATES PATENTS 1,282,743  10/1918  Brenkert.
1,365,723  1/1921  Patterson.

HARRY N. HAROIAN, Primary Examiner